UNITED STATES PATENT OFFICE.

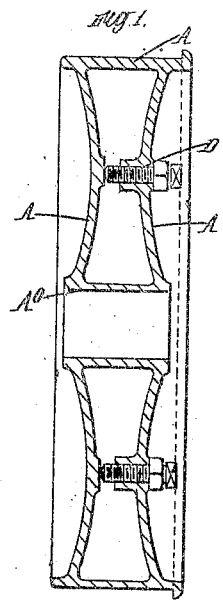
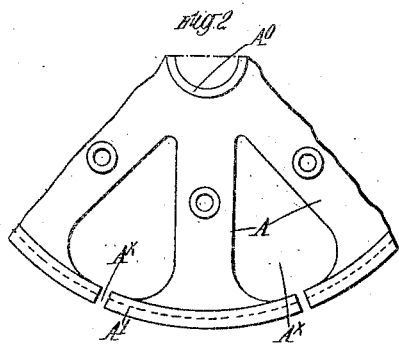
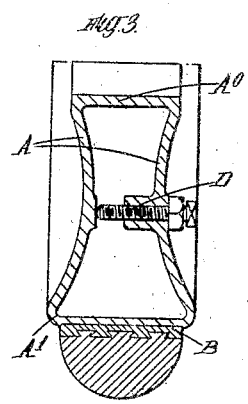
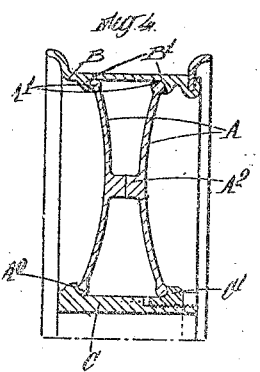
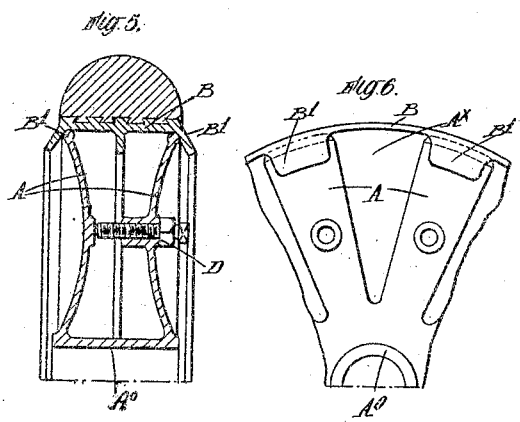

COLIN MACBETH, OF BIRMINGHAM, ENGLAND, ASSIGNOR TO THE DUNLOP RUBBER COMPANY, LIMITED, OF WESTMINSTER, LONDON, ENGLAND.

VEHICLE-WHEEL.

1,365,637.

Specification of Letters Patent.

Patented Jan. 11, 1921.

Application filed November 14, 1919. Serial No. 338,004.

*To all whom it may concern:*

Be it known that I, COLIN MACBETH, a subject of the King of Great Britain, residing at Para Mills, Aston Cross, Birmingham, in the county of Warwick, England, have invented certain new and useful Improvements in Vehicle-Wheels, of which the following is a specification.

This invention relates to metal vehicle wheels and has general reference to the wheel set forth in the specification of my United States Patent No. 1305820, in which the spoke members (which are separate or in one piece) are adapted to be radially expanded by applying a transverse or axial thrust or pressure thereto so as to cause the outer part, on which the tire base or rim is seated, to bear against the latter without being transversely or axially moved.

According to this invention, the spoke members are inwardly dished or coned toward each other and are so constructed and arranged at their outer and inner parts relatively to the tire base or rim and the hub or seating respectively, that they can be expanded radially by applying the transverse or axial thrust or pressure without causing the outer or rim part or parts to be transversely moved or adjusted.

In order that the said invention may be clearly understood and readily carried into effect, the same will now be described more fully with reference to the accompanying diagrammatic drawings, in which:—

Figures 1 and 2 are respectively a vertical sectional and a partial side view of one construction of the improved wheel in which the spoke members on each side of the vertical plane of the wheel are constructed in one piece.

Fig. 3 is a similar view to Fig. 1, illustrating a slight modification.

Fig. 4 is also a similar view to Fig. 1 showing separate spoke members.

Figs. 5 and 6 are similar views to Figs. 1 and 2 illustrating a further slight modification.

A, A are the inwardly dished or coned spoke members. A' A' represent the outer parts of the spoke members on which a tire base or rim B (see Figs. 3 and 5) is seated. A° is a hub portion or sleeve adapted to surround the wheel hub or axle or other suitable seating. The spoke members A, A are formed with radial slits or gaps $A^x$ dividing the outer parts A' transversely and extending to near the inner or hub portion A° which as shown in Fig. 1 is constructed in one piece so that the two spoke members A, A extend therefrom and are integral therewith. As shown in Fig. 1, the outer parts of the spoke members may be joined to constitute a felly for the tire base or rim, this felly however being transversely divided by the gaps $A^x$. The spoke members are inwardly dished or coned to the maximum extent at a point approximately midway between the felly and the inner or hub part A°. Forcing screws D may be threaded into bosses around one of the spoke members as shown in Fig. 1 approximately midway between the rim or hub and by rotating the screws D in a direction to force the members A apart the latter tend to straighten out and thus radially expand with the result that the rim or felly part A' engages with the tire base or rim. The example shown in Fig. 3 is generally similar to that illustrated in Fig. 1, the shape of the outer part A' however being slightly different. In the modifications illustrated in Figs. 4 and 5 the outer or rim parts A, A' of the two spoke members may be circumferentially divided or separated each rim part being shaped to engage with a tire base or rim by spherical or rounded bearing surfaces, for example as set forth in the specification of my concurrent application. In the construction shown in Fig. 5 the outer parts A' of the spoke members may be rounded to bear against lateral flanges or projections B' on the tire base B, these projections being inclined outwardly to prevent damage to the tire by forcible contact with curbstones or other road obstructions. The spoke members are joined at their inner parts by a common hub A° and forcing screws D are provided for causing the radial expansion of the spoke members as hereinbefore described. The stops or projections B' on the tire base are spaced apart as shown in Fig. 6 and the radial gaps $A^x$ in the spoke members are so formed as to provide radial spoke portions which can be passed between the stops so that by effecting relative angular movement between the spoke members and the tire base, the outer parts of the spoke members can be caused to lie or bear against the inner sides of the stops as shown in Figs. 5 and 6, this arrangement forming a kind of bayonet joint connection between the rim and spoke members. In Fig. 4, the spoke members A, A are entirely separated and at their inner parts A° they are rounded and held between flanges on a sleeve C and a nut C' which is threaded on to the sleeve as shown. The outer parts of the spoke members are beaded or rounded to engage with stops B' on the inner surface of the tire rim B, which stops may be spaced apart as described in connection with the modification illustrated in Figs. 5 and 6 for enabling the spoke members to be placed within the stops B' as shown. At points approximately midway between the rim and hub the opposing faces of the inwardly dished spoke members are formed with abutting lugs or projections A², A², so that by screwing up the nut C' on the sleeve C the spoke members being restrained against movement by the said lugs or projections A², A², tend to straighten out and thus radially expand so as to secure the tire rim in position. This method of effecting radial expansion may be used in cases where the outer parts are joined by a common felly portion, and the inner parts are separated. When the outer parts of the spoke members are not connected by a common felly portion, they tend to move outwardly in a transverse direction during the radial expansion, but the bearing stops or flanges B' on the tire base or rim being arranged on the outside of the outer parts A' of the spoke members prevent any such transverse movement thereof.

As used in this specification, the term "inwardly dished spoke members" is to be understood as referring to the particular type of spoke members illustrated, namely, that in which the convex surfaces of opposed sections are adjacent to each other.

What I claim and desire to secure by Letters Patent of the United States is:—

1. A metal vehicle wheel comprising, a hub, a rim, and inwardly dished spoke members extending between the hub and rim and adapted to be expanded radially by pressure applied transversely or in a line substantially parallel to the length of the wheel axis.

2. A metal vehicle wheel comprising a hub, a rim, inwardly dished spoke members extending from the hub to the rim, and means situated between the hub and rim for applying pressure to the spoke members, whereby they will be expanded radially.

3. A metal vehicle wheel comprising a hub, a rim, inwardly dished spoke members positioned between the hub and rim, the peripheries of said spoke members being slotted, and means for applying pressure transversely to the spoke members, whereby they will be expanded radially.

4. A metal vehicle wheel comprising a hub, a rim, having a plurality of abutments on its inner surface, inwardly dished spoke members extending from the hub and bearing against said abutments on the rim, and means for applying pressure to the spoke members to expand them radially.

5. A metal vehicle wheel comprising a hub, a rim, inwardly dished spoke members extending from the hub to the rim, and a plurality of screw members adapted to apply pressure transversely to the spoke members to expand them radially.

6. A metal vehicle wheel comprising a hub, a rim having a plurality of annularly spaced abutments on its inner surface adjacent each edge, oppositely dished spoke members extending from the hub and bearing against said abutments on the rim, the spoke members at each side of a central vertical plane through the wheel lying entirely at one side of said plane throughout their length, and means for applying pressure to the spoke members to expand them radially.

7. A metal vehicle wheel comprising a hub, a rim having a plurality of annularly spaced abutments on its inner surface adjacent each edge, oppositely dished spoke members extending from the hub, the spoke members at each side of a central vertical plane through the wheel lying entirely at one side of said plane throughout their length and adapted to be positioned to bear against said abutments by a relative angular movement between said members and the rim, and means for applying pressure to the spoke members to expand them radially.

8. A metal vehicle wheel comprising a hub, a rim having two series of annularly spaced abutments on its inner surface, and spoke members extending from the hub to the rim between said abutments thereon, and each comprising oppositely dished side members having their convex surfaces adjacent each other, said spoke members and rim being relatively adjustable angularly to position the spoke members between adjacent abutments or in alinement therewith.

9. A metal vehicle wheel comprising a hub, a rim having two series of annularly spaced abutments on its inner surface, and inwardly dished spoke members extending between the hub and rim and positioned to bear against said abutments, the spoke members at each side of a central vertical plane through the wheel lying entirely at one side of said plane throughout their length.

COLIN MACBETH.